May 28, 1929.  A. L. M. PIRRONE  1,715,145
NONSKIDDING AUTOMOBILE WHEEL
Filed March 26, 1926
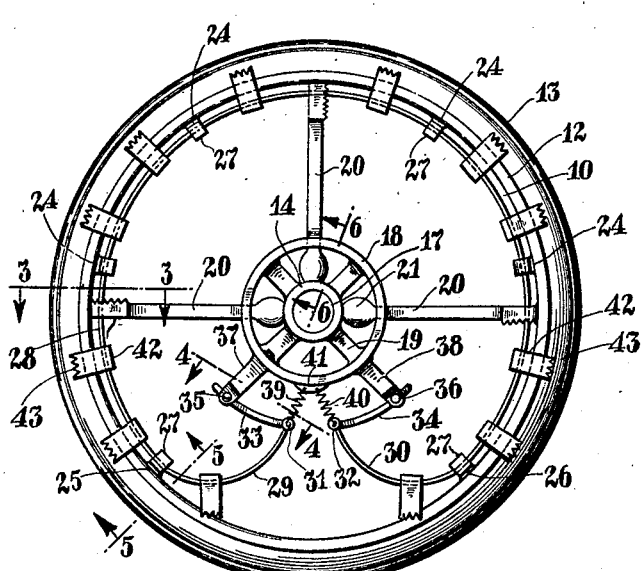
Fig. 1.
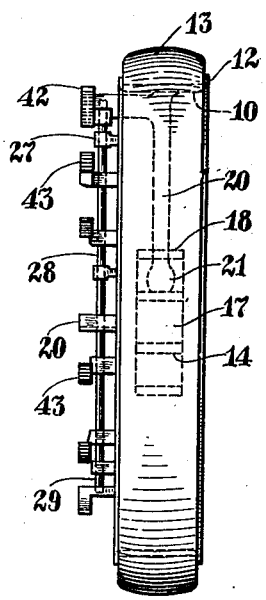
Fig. 2.
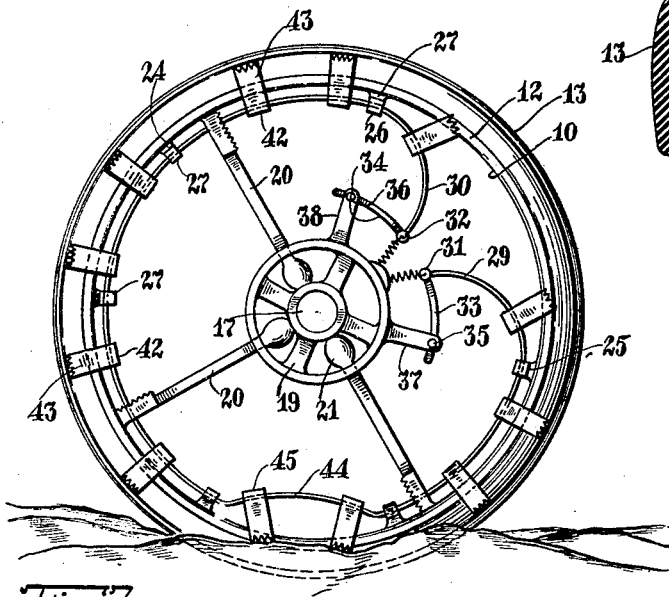
Fig. 7.
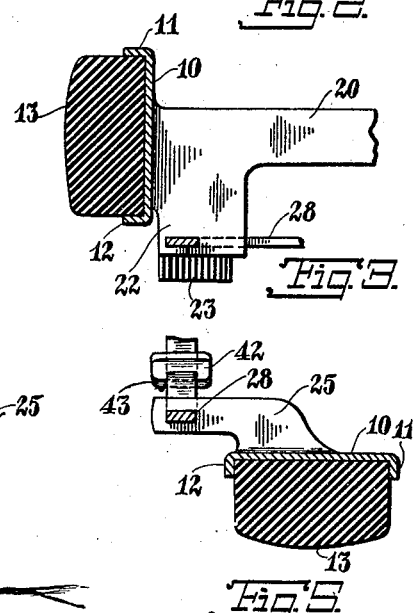
Fig. 3.
Fig. 5.
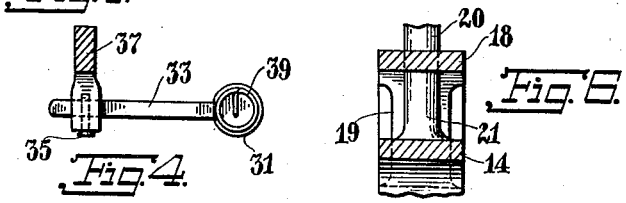
Fig. 4.  Fig. 6.
INVENTOR
Antonio L. M. Pirrone
BY
ATTORNEY Patented May 28, 1929.

1,715,145

UNITED STATES PATENT OFFICE.

ANTONIO L. M. PIRRONE, OF NEW KENSINGTON, PENNSYLVANIA, ASSIGNOR OF FORTY-FIVE PER CENT TO SIGMOND EDELSON, OF PENNSYLVANIA.

NONSKIDDING AUTOMOBILE WHEEL.

Application filed March 26, 1928. Serial No. 264,828.

This invention relates to a new and useful device in the nature of a non-skid automobile wheel especially adapted for the purpose of providing traction on ice, frozen snow or the like or on rough roads, and as a means of preventing skidding of the automobile equipped with my improved wheel.

The object of the invention is to provide a non-skid automobile wheel of novel construction and arrangement of parts hereinafter more fully described, claimed, and illustrated in the accompanying drawing.

Fig. 1 is a front elevational view of my improved non-skid automobile wheel.

Fig. 2 is an edge elevational view thereof.

Fig. 3 is an enlarged transverse sectional view taken on the line 3—3 of Fig. 1.

Fig. 4 is a similar sectional view taken on the line 4—4 of Fig. 1.

Fig. 5 is a similar sectional view taken on the line 5—5 of Fig. 1.

Fig. 6 is a similar sectional view taken on the line 6—6 of Fig. 1.

Fig. 7 is a similar view to that shown in Fig. 1, illustrating my improved non-skid automobile wheel as it would appear when in use.

As here embodied my improved non-skid automobile wheel comprises a felly band 10, or rim of the usual ring shaped construction provided with flanged elements 11 and 12, adapted to receive the tire 13 which is secured thereto in the usual well known manner, such as is common to solid tires.

The hub 14 is substantially of tubular construction, and is provided with an axial opening 17 adapted to receive the axle shaft of the automobile and is provided with any suitable means rigidly and removably securing the said hub to the axle shaft, as is required by the design and type of the axle shaft, and which does not constitute a part of my invention.

The reinforcing hub 18 is of ring shaped construction somewhat larger in size or diameter than the hub 14 and is co-axially secured thereto by the spokes 19 radially positioned or extended from the said hub. The main spokes 20, preferably three in number, are provided with enlarged inner extremities 21, positioned intermediate the hub 14 and the reinforcing hub 17 and are secured to the two latter mentioned elements, and extended through apertures formed in the said reinforcing hub. The main spokes 20 are radially disposed from the said hub 14, and are positioned or spaced at approximately 90° apart, and are secured at their extended extremities to the felly band 10. The main spokes 20 are provided with side extended elements 22, located in proximity to the extended extremities of the said main spokes and which extend outwardly herefrom. The extended elements 22 have formed therein serrations 23 or teeth, for the purpose hereinafter set forth.

Brackets 24 are secured to and extended inwardly from the felly band 10 and are positioned intermediate the main spokes 20. Similar brackets 25 and 26 are positioned or spaced at approximately 90° apart, and are located equidistant from the two of the said main spokes which are oppositely extended. The brackets 24, 25 and 26 are provided with outwardly, side extended elements 27 having formed therein apertures adapted to freely receive the traction band 28. Similar apertures are formed in the extended elements 22 of the main spokes 20. The band 28 is of spring steel construction and is formed or bent substantially circular, and has its extremities 29 and 30, formed or bent inwardly, and secured as at 31 and 32, respectively, to the extended extremities of the supports 33 and 34, respectively. The supports 33 and 34 are of spring steel construction, formed or bent arc shaped and are secured as at 35 and 36, at their inner extremities to the extended extremities of the brackets 37 and 38 secured to and radially extended from the reinforcing hub 18.

Tension springs 39 and 40 are secured to the extended extremities of the supports 33 and 34, respectively, and are secured to the lug element 41 of the reinforcing hub 18, positioned intermediate the said supports 37 and 38.

A plurality of traction blocks 42 have formed therein apertures adapted to receive the band 28 and are secured thereto and are provided with serrations 43, located in the outer surface of the said blocks for the purpose as hereinafter set forth.

The above described construction is such as will permit the supports 33 and 34, co-acting with the springs 39 and 40 to normally hold the traction band 28 co-axial with the tire 13, and will permit any portion of the said traction band to deflect somewhat inwardly, as designated by the reference numeral 44, when the traction block indicated by the reference numeral 45 adjacent to the deflected portion of the said traction band encounters or engages ice, or any hard uneven road surface, as a means of providing traction which will obviously prevent skidding. In such instances the tire due to the driving effort invariably digs into or somewhat sinks into the said road surface.

Having thus described my invention what I claim as new and desire to protect by United States Letters Patent is:—

1. A non-skid automobile wheel of the class described comprising a plurality of traction blocks secured to a band, said band maintained co-axial with the tire of the said device, supports secured to the extremities of the said bands and to tension springs, said tension springs secured to a reinforcing hub.

2. In a non-skid automobile wheel of the class described, a traction band engaging in apertures formed in brackets secured to and extended inwardly from the felly band of the said wheel, and engaging in apertures formed in lugs extending laterally from the outer ends of the spokes, said traction band having a plurality of traction blocks secured thereto, the extremities of the said band being secured to supports extended from a reinforcing hub co-axially mounted on the hub of the said wheel, and tension springs secured to the said reinforcing hub and to the extended extremities of the said supports.

In testimony whereof I have affixed my signature.

ANTONIO L. M. PIRRONE.